Figure 1:
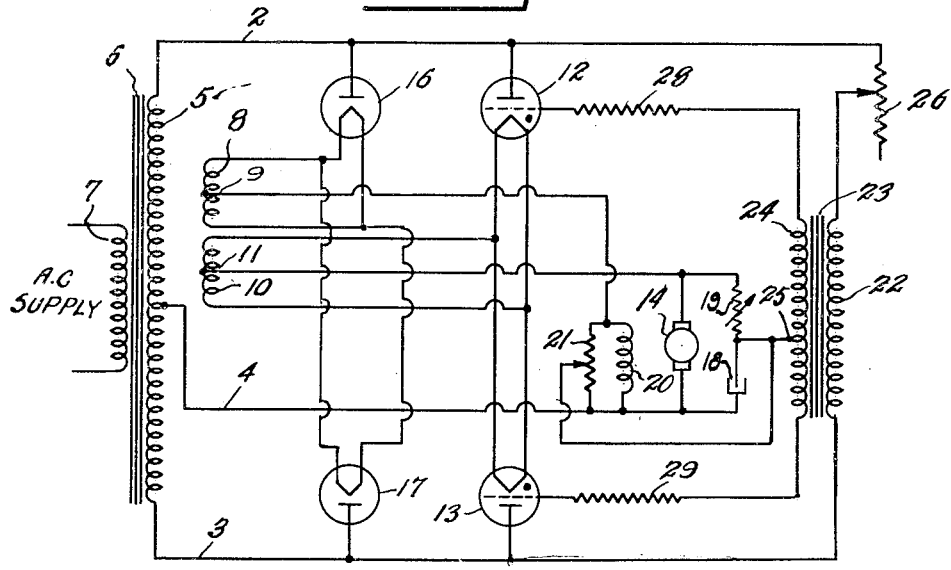

Feb. 6, 1951

B. A. KNAUTH 2,540,452

THYRATRON CONTROL APPARATUS

Filed March 1, 1948

INVENTORS
BERTHOLD A. KNAUTH

BY
Semmes, Keegin, Robinson & Semmes
ATTORNEYS

Patented Feb. 6, 1951

2,540,452

UNITED STATES PATENT OFFICE 2,540,452

THYRATRON CONTROL APPARATUS

Berthold A. Knauth, Bolton, N. Y., assignor to The Motorspeed Corporation, New York, N. Y.

Application March 1, 1948, Serial No. 12,329

8 Claims. (Cl. 318—331)

My invention relates to controlling the firing angle of thyratron tubes in which it has many applications, such as arc-welding, resistance welding, servo mechanisms, the control of the rate of rotation of electric motors, and other applications which will be apparent from the ensuing description.

While the drawings illustrate the system as applied to the control of the rate of rotation of a direct current motor, it will be apparent that the system has many other applications in industry where similar electrical conditions are desired in operating circuits.

In the particular illustrations which we have shown in the drawings, one of the important objects of the invention is to maintain a constant speed, with automatic compensation for change in the load imposed on the motor. A particular use for this system is to maintain a constant speed in, for instance, a pumping mechanism, where the motor may be subjected to varying loads by reason of the change in viscosity of the liquid which is being pumped.

In controlling the firing of thyratron tubes which are grid-controlled gaseous discharge devices that permit the passage of current in only one direction, there are several factors which, in general, effect the firing of the tubes. Control of the output of the tubes can be effected by controlling the firing angle which is dependent on a combination, among others, of the following factors: (1) The grid-to-cathode potential, or grid bias, of the tube as effected by the net instantaneous algebraic sum of the voltage or voltages applied to the grid; (2) The simultaneously occurring anode-to-cathode potential of the tube which is the net instantaneous algebraic sum of all the voltages applied to the anode, which in this instance includes both the alternating supply voltage and the counter E. M. F. of the motor armature. It is believed to be unnecessary to fully explan the operation of the combination of factors above mentioned. However, it can be stated that I have achieved improvements in the creation and control of these factors over other systems known in the art.

In my system I employ means for generating an adjustable direct potential, which is one component of voltage by which the grid of the thyratron tube is biased, and which is derived indirectly from the source of alternating current with which the system is supplied, and thus we obtain an adjustable reference voltage without the use of auxiliary equipment.

The phase shifting of the alternating potential applied to the grid has been accomplished in a novel manner which gives more complete and accurate control of the operating characteristics of the system than has heretofore been possible.

An object of this invention is to provide a thyratron control circuit for D. C. motors that is practical for use with either series wound or shunt wound motors.

Another object of this invention is to provide a thyratron control circuit for D. C. motors in which a resistance-capacitance circuit connected across the motor armature is used to shift the phase of the grid voltage of the thyratron.

A further object of this invention is to provide a thyratron control circuit for D. C. motors in which a pair of thyratrons are connected to supply the D. C. to the motor and in which a transformer is connected between the thyratron grids and a resistance-capacitance circuit connected across the motor armature to supply grid potential to the thyratrons.

Other and further objects of this invention will be apparent to those skilled in the art to which it relates from the following specification, claims and drawing.

Figure 2:
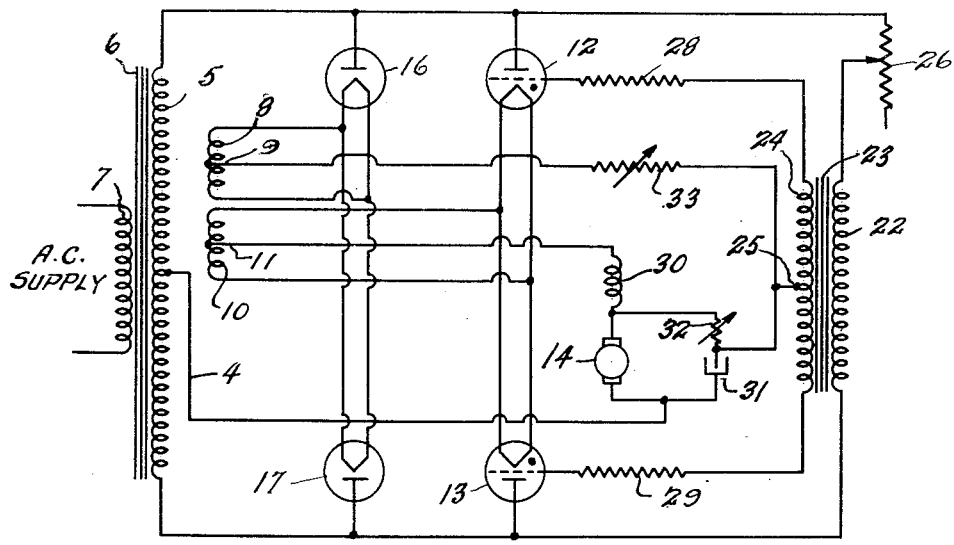

In the drawing:

Figure 1 is a schematic wiring diagram of a thyratron control circuit connected to supply the armature current to a shunt wound D. C. motor and Figure 2 is a schematic wiring diagram of a thyratron control circuit for supplying the current to the armature and field of a series wound D. C. motor.

In Figure 1 of the drawing is illustrated a thyratron control circuit for shunt wound D. C. motors in which the A. C. lines 2 and 3 are connected to the ends of the secondary 5 of the transformer 6. Additional secondaries 8 and 10 are also provided to the transformer 6 and these secondaries 5, 8 and 10 are all inductively coupled to the primary 7.

Lines 2 and 3 are connected to the anodes of the thyratrons 12 and 13 respectively and to the anodes of the rectifiers 16 and 17 respectively. The cathodes of the thyratrons 12 and 13 are connected together to the secondary 10 of the transformer 6 and the cathodes of the rectifiers 16 and 17 are connected together to the secondary 8. The center tap 11 of the secondary 10 is connected to one brush of the armature 14 of the D. C. motor and to one terminal of the resistor 19. The other brush of the armature 14 is connected to the A. C. line 4 that is connected to the center tap of the secondary 5. The lower brush of the armature 14 is also connected to the lower terminal of capacitor 18, to the lower terminal of the field 20, and to the lower terminal of the potentiometer 21. The upper terminal of the field 20 is connected to the upper terminal of the potentiometer 21 and to the center tap 9 of the secondary 8.

The primary 22 of the transformer 23 is connected in series with the variable resistor 26 across the lines 2 and 3 so as to supply alternating potential to the secondary 24 of this transformer 23. The terminals of the secondary 24 are connected to the grids of the thyratrons 12 and 13 through the grid current limiting resistors 28 and 29 respectively. The center tap 25 of the secondary 24 is connected to the junction between the upper terminal of the capacitor 18 and the lower terminal of the resistor 19. The slider of the potentiometer 21 is also connected to the center tap 25 of the secondary 24.

In this circuit arrangement the rectifiers 16 and 17 are connected as diametric (full wave) rectifiers to supply current to the field 20 of the D. C. motor and to supply grid voltage to the potentiometer 21 for controlling the firing of the thyratrons 12 and 13 to regulate the speed of the D. C. motor. The thyratrons 12 and 13 are employed to rectify the alternating current to supply D. C. pulses to the armature 14.

The amount of A. C. supplied to the grids of the thyratrons 12 and 13 from the lines 2 and 3 through the transformer 23 is controlled by the variable resistor 26. The level of the D. C. on the thyratron grids is set by the slider of the potentiometer 21 plus the signal on the capacitor 18 derived from the motor armature 14 through the resistor 19. By adjusting the resistor 19 and capacitor 18 to proper values the firing of the thyratron 12 and 13 can be regulated by the signal supplied across the capacitor 18 by the wave form of the armature 14 so that the speed of the armature may be maintained substantially at a pre-set value even though the load on the armature changes.

In Figure 2 is illustrated a thyratron control circuit for D. C. motors having series wound fields. The parts of the wiring diagram shown in Figure 2 corresponding to those of Figure 1 are designated by like reference numerals.

In the embodiment of this invention shown in Figure 2 the armature 14 of the D. C. motor is connected in series with the series field 30 to the center tap of the secondary 10 that is employed for heating the cathodes of the thyratrons 12 and 13. The lower brush of the armature 14 is connected to the line 4 that is connected to the center tap of the secondary 5.

Thus the thyratrons 12 and 13 are employed to rectify alternating current to supply D. C. pulses to both the field 30 and armature 14 of the series wound D. C. motor. The lower brush of the armature 14 is also connected to the lower terminal of the capacitor 31. The upper terminal of the capacitor 31 is connected to the resistor 32, to the center tap 25 of the secondary 24, and to one terminal of the variable resistor 33, the other terminal of the resistor being connected to the center tap 9 of the secondary 8.

The rectifiers 16 and 17 in the circuit shown in Figure 2 function to provide full wave rectified A. C. for the grids of the thyratrons 12 and 13. Accordingly the cathodes of the rectifiers 16 and 17 are connected together to the secondary 8 of the transformer 6, that provides the cathode heating current for rectifiers 16 and 17, and the center tap 9 of the secondary 8 is connected to one terminal of the speed control resistor 33.

The other terminal of the resistor 33 is connected to the center tap 25 of the secondary 24 so that the D. C. potential supplied by the full wave rectifiers 16 and 17 is applied across the resistor 33, resistor 32 and the armature 14 since these resistors and the motor armature are connected in series between the cathodes of the rectifiers 16 and 17 and the line 4 connected to the center tap of the secondary 5.

However, since the series field 30 and resistor 32 are connected between the cathodes of the thyratrons 12 and 13, and the center tap 25 of the secondary 24, the algebraic sum of the potentials across these elements is impressed upon the grid circuits of the thyratrons. Thus the resistor 33 may be used to control the D. C. applied to the grids of the thyratrons and thereby control the speed of the armature.

The variable resistor 26 controls the A. C. voltage applied to the grids of the thyratrons. The resistor 32 in series with the capacitor 31 functions also to supply a potential having a wave form similar to the wave form of the D. C. pulses supplied to the armature 14, to the grid circuits of the thyratrons. In addition to the above functions the resistor 32 and capacitor 31 operate as a phase shifting network for shifting the phase of the A. C. supplied to the thyratron grids.

While I have shown my system as applied to a motor control mechanism, it will be obvious that the system is useful in many other connections, and that the immediate application has been illustrated and described merely to illustrate the invention. We desire that our invention be limited only by the scope of the appended claims and the showing of the prior art.

I claim:

1. A thyratron control system for direct current motors comprising a pair of thyratrons each having an anode, a grid and a cathode, a direct current motor having a field winding and an armature, one side of said armature being connected to said thyratron cathodes, a resistor and a capacitor connected in series across said armature, a source of alternating current connected to the other side of said motor armature and to said thyratron anodes, a source of direct current for said motor field winding, and a transformer having a primary connected to said source of alternating current and a secondary connected to said thyratron grids, said secondary having a center tap connected to the junction between said resistor and said capacitor.

2. A thyratron control system for controlling a direct current motor comprising a pair of thyratrons each having an anode, a grid and a cathode, a direct current motor having an armature connected between said thyratrons and an alternating current supply, a resistor and a capacitor connected across said armature, a transformer connected to said alternating supply and to the junction between said resistor and said capacitor, means connecting the secondary of said transformer to the thyratron grids, a rectifier connected to said alternating current supply for supplying direct current to the field of said motor, a potentiometer connected across said motor field winding, and connections for connecting the variable contactor of said potentiometer to the secondary of said transformer.

3. A thyratron control system for controlling a direct current motor comprising a thyratron having an anode, a grid and a cathode, a direct current motor having an armature winding connected in series with said thyratron across an alternating current supply, a phase shifting circuit connected across said armature, a transformer connected to said alternating supply for supplying A. C. to said phase shifting circuit and said thyratron grid, a rectifier connected to said alternating current supply for supplying direct current to the field of said motor, a resistor connected between said rectifier and the secondary of said transformer for controlling the D. C. supplied to said thyratron grid.

4. A thyratron control system for controlling a direct current motor comprising a thyratron having an anode, a grid and a cathode, a direct current motor having an armature and a field connected in series with said thyratron across an alternating current supply, a resistor and a capacitor connected in series across said armature, a transformer connected to said alternating supply and to the junction of said resistor and said capacitor, a rectifier connected to said alternating current supply for supplying direct current to the grid of said thyratron and a resistor connected between said rectifier and the secondary of said transformer for controlling the D. C. supplied to said thyratron grid.

5. A thyratron control system for direct current motors comprising a pair of thyratrons each having an anode, a grid and a cathode, said thyratrons having the cathodes connected together, a transformer having a center tapped secondary, the ends of said secondary being connected to the anodes of said thyratrons, a motor having an armature and a field connected in series between the cathodes of said thyratrons and the center tap of said secondary, a second transformer, a resistor and a capacitor connected in series across said armature, the secondary of said second transformer having a center tap connected to the junction between said resistor and said capacitor and connections for connecting the terminals of said second transformer secondary to the grids of said thyratrons.

6. A thyratron control system for controlling a direct current motor comprising a pair of thyratrons each having an anode, a grid and a cathode, a direct current motor having an armature connected in series with said thyratrons across an alternating current supply, a resistor and a capacitor connected across said armature, a transformer having a primary connected to said alternating supply and a secondary connected to the junction between said resistor and said capacitor, means connecting the secondary of the transformer to the thyratron grids, a variable resistor connected in series with the primary of the transformer, a rectifier connected to said alternating current supply for supplying direct current to the field of said motor, a potentiometer connected across said motor field winding, and connections for connecting the variable contactor of said potentiometer to the secondary of said transformer.

7. A thyratron control system for controlling a direct current motor comprising a pair of thyratrons each having an anode, a grid and a cathode, a direct current motor having an armature connected in series with said thyratrons across an alternating current supply, a transformer having its primary connected to the alternating current supply, the terminals of the secondary of the transformer being connected to the grids of the thyratrons, a phase shifting circuit comprising a resistor and a capacitor connected in series across the armature of the motor, and a center tap in the secondary of the transformer, the junction of the resistor and capacitor being connected to the center tap to shift the phase of the alternating current potential on the grid.

8. A thyratron control system for controlling a direct current motor comprising a pair of thyratrons each having an anode, a grid and a cathode, a direct current motor having an armature connected in series with said thyratrons across an alternating current supply, a transformer having its primary connected to the alternating current supply, the terminals of the secondary of the transformer being connected to the grids of the thyratrons, a phase shifting circuit comprising a resistor and a capacitor connected in series across the armature of the motor, and a center tap in the secondary of the transformer, the junction of the resistor and capacitor being connected to the center tap to shift the phase of the alternating current potential on the grid, a rectifier connected across the alternating current supply, and means connecting the rectifier with the junction of the resistor and capacitor and center tap to provide a direct current potential on the grid.

BERTHOLD A. KNAUTH.

REFERENCES CITED

The following references are of record in the file of this patent:

UNITED STATES PATENTS

| Number | Name | Date |
|---|---|---|
| 2,082,496 | Howe | June 1, 1937 |
| 2,236,086 | Conover | Mar. 25, 1941 |